US011295228B2

(12) United States Patent
Hosabettu et al.

(10) Patent No.: US 11,295,228 B2
(45) Date of Patent: Apr. 5, 2022

(54) METHODS FOR CREATING AUTOMATED DYNAMIC WORKFLOWS OF INTEROPERABLE BOTS AND DEVICES THEREOF

(71) Applicant: Wipro Limited, Bangalore (IN)

(72) Inventors: Raghavendra Hosabettu, Bangalore (IN); RamPrasad Kanakatte Ramanna, Bangalore (IN); Raghottam Mannopantar, Bangalore (IN); Ponnusamy Ananthasankaranarayanan, Bangalore (IN); Harihara Vinayakaram Natarajan, Bangalore (IN)

(73) Assignee: Wipro Limited, Bangalore (IN)

( * ) Notice: Subject to any disclaimer, the term of this patent is extended or adjusted under 35 U.S.C. 154(b) by 1654 days.

(21) Appl. No.: 15/080,030

(22) Filed: Mar. 24, 2016

(65) Prior Publication Data
US 2017/0270431 A1    Sep. 21, 2017

(30) Foreign Application Priority Data
Mar. 21, 2016   (IN) ............................ 201641009861

(51) Int. Cl.
G06N 20/00   (2019.01)
G06F 9/48    (2006.01)
G06Q 10/06   (2012.01)

(52) U.S. Cl.
CPC ........... *G06N 20/00* (2019.01); *G06F 9/4881* (2013.01); *G06Q 10/06* (2013.01)

(58) Field of Classification Search
CPC ....... G06N 20/00; G06F 9/4881; G06Q 10/06
See application file for complete search history.

(56) References Cited

U.S. PATENT DOCUMENTS 6,754,647 B1   6/2004   Tackett et al.
7,039,654 B1   5/2006   Eder
(Continued)

FOREIGN PATENT DOCUMENTS

EP   0862113 A2   9/1998

OTHER PUBLICATIONS

Lin, et al., "Dynamic Business Process Formation by Integrating Simulate and Physical Agent System", Proceedings of the 37th Hawaii International Conference on System Sciences, 2004 (Year: 2004).*

*Primary Examiner* — Tsu-Chang Lee
(74) *Attorney, Agent, or Firm* — Finnegan, Henderson, Farabow, Garrett & Dunner, LLP (57) ABSTRACT

Methods, devices, and non-transitory computer readable media that add interoperable BOTs to a stored BOT inventory. Each of the BOTs is associated with a BOT type, has a common structure, and automates at least a portion of an enterprise process. Assembly rules are obtained. Each of the assembly rules includes one or more constraints for inclusion of one or more of the BOTs in one or more of a plurality of workflows based on the one of the BOT types associated with each of the one or more of the BOTs. The workflows are assembled based on one or more the assembly rules. Each of the workflows comprises a subset of the BOTs and each BOT of the subsets of the BOTs is included in one or more of the workflows based on at least one of an associated functionality, performance, or service level.

13 Claims, 5 Drawing Sheets

(56) References Cited

U.S. PATENT DOCUMENTS

| | | | |
|---|---|---|---|
| 7,861,252 B2 | 12/2010 | Uszok et al. | |
| 2009/0299802 A1* | 12/2009 | Brennan | G06Q 10/06 |
| | | | 705/7.36 |
| 2011/0082717 A1* | 4/2011 | Saad | G06Q 10/06 |
| | | | 705/7.13 |
| 2015/0058265 A1* | 2/2015 | Padala | G06N 20/00 |
| | | | 706/12 |
| 2016/0019484 A1* | 1/2016 | Srivastava | G06Q 10/06313 |
| | | | 705/7.17 |
| 2016/0034305 A1* | 2/2016 | Shear | G06F 16/248 |
| | | | 707/722 |

* cited by examiner

METHODS FOR CREATING AUTOMATED DYNAMIC WORKFLOWS OF INTEROPERABLE BOTS AND DEVICES THEREOF

This application claims the benefit of Indian Patent Application Serial No. 201641009861, filed Mar. 21, 2016, which is hereby incorporated by reference in its entirety.

FIELD

This technology relates to methods for creating dynamic workflows of interoperable application components, referred to as BOTs, which automate portions of enterprise processes, and devices thereof.

BACKGROUND

Portions of enterprise processes are increasingly automated by applications or software components referred to herein as BOTs. BOTs can understand activities, order, and flows of processes, automatically generate rules, perform machine learning and artificial intelligence processes, and validate learned information. As some examples, BOTs can curate requests or problems associated with an enterprise, classify the problems, and automatically resolve the problems, although many other types of BOTs are also currently used by enterprises.

However, there is currently no effective automated way to integrate BOTs into workflows that replicate an entire enterprise process. Additionally, BOTs currently operate relatively independently without interoperability, collaboration, or knowledge transfer, resulting in reduced effectiveness of the BOTs to perform their intended functions. Moreover, there is currently no effective way to automatically evaluate the performance of BOTs in order to dynamically assemble relatively high performing workflows.

SUMMARY

A method for creating automated dynamic workflows of interoperable BOTs includes adding, by an enterprise BOT management computing device, a plurality of interoperable BOTs to a stored BOT inventory. Each of the BOTs is associated with one of a plurality of BOT types, has a common structure, and automates at least a portion of an enterprise process. A plurality of assembly rules is obtained by the enterprise BOT management computing device. Each of the assembly rules includes one or more constraints for inclusion of one or more of the BOTs in one or more of a plurality of workflows based on the one of the BOT types associated with each of the one or more of the BOTs. The plurality of workflows is assembled by the enterprise BOT management computing device based on one or more the assembly rules. Each of the workflows includes a subset of the BOTs and each BOT of the subsets of the BOTs is included in one or more of the workflows based on at least one of an associated functionality, performance, or service level.

An enterprise bot management computing device includes memory comprising programmed instructions stored in the memory and one or more processors configured to be capable of executing the programmed instructions stored in the memory to add a plurality of interoperable BOTs to a stored BOT inventory. Each of the BOTs is associated with one of a plurality of BOT types, has a common structure, and automates at least a portion of an enterprise process. A plurality of assembly rules is obtained. Each of the assembly rules includes one or more constraints for inclusion of one or more of the BOTs in one or more of a plurality of workflows based on the one of the BOT types associated with each of the one or more of the BOTs. The plurality of workflows is assembled based on one or more the assembly rules. Each of the workflows includes a subset of the BOTs and each BOT of the subsets of the BOTs is included in one or more of the workflows based on at least one of an associated functionality, performance, or service level.

A non-transitory computer readable medium having stored thereon instructions for creating automated dynamic workflows of interoperable BOTs includes executable code which when executed by one or more processors, causes the processors to perform steps comprising adding a plurality of interoperable BOTs to a stored BOT inventory. Each of the BOTs is associated with one of a plurality of BOT types, has a common structure, and automates at least a portion of an enterprise process. A plurality of assembly rules is obtained. Each of the assembly rules includes one or more constraints for inclusion of one or more of the BOTs in one or more of a plurality of workflows based on the one of the BOT types associated with each of the one or more of the BOTs. The plurality of workflows is assembled based on one or more the assembly rules. Each of the workflows includes a subset of the BOTs and each BOT of the subsets of the BOTs is included in one or more of the workflows based on at least one of an associated functionality, performance, or service level.

This technology provides a number of advantages including methods, devices, and non-transitory computer readable media that create automated dynamic workflows of interoperable BOTs and more effectively evaluate the performance of the BOTs and workflows. With this technology, interoperable BOTs having a common structure are more efficiently and effectively assembled into workflows based on assembly rules and an associated BOT type. The workflows can be generated based on functionality, performance, or service level of the included BOTs. This technology can also more effectively evaluate the performance of multiple versions of workflows with varying sets of BOTs, as well as variants of the BOTs themselves. Accordingly, this technology improves the effectiveness of automated solutions for enterprise processes that utilize BOTs.

DETAILED DESCRIPTION

Figure 1:
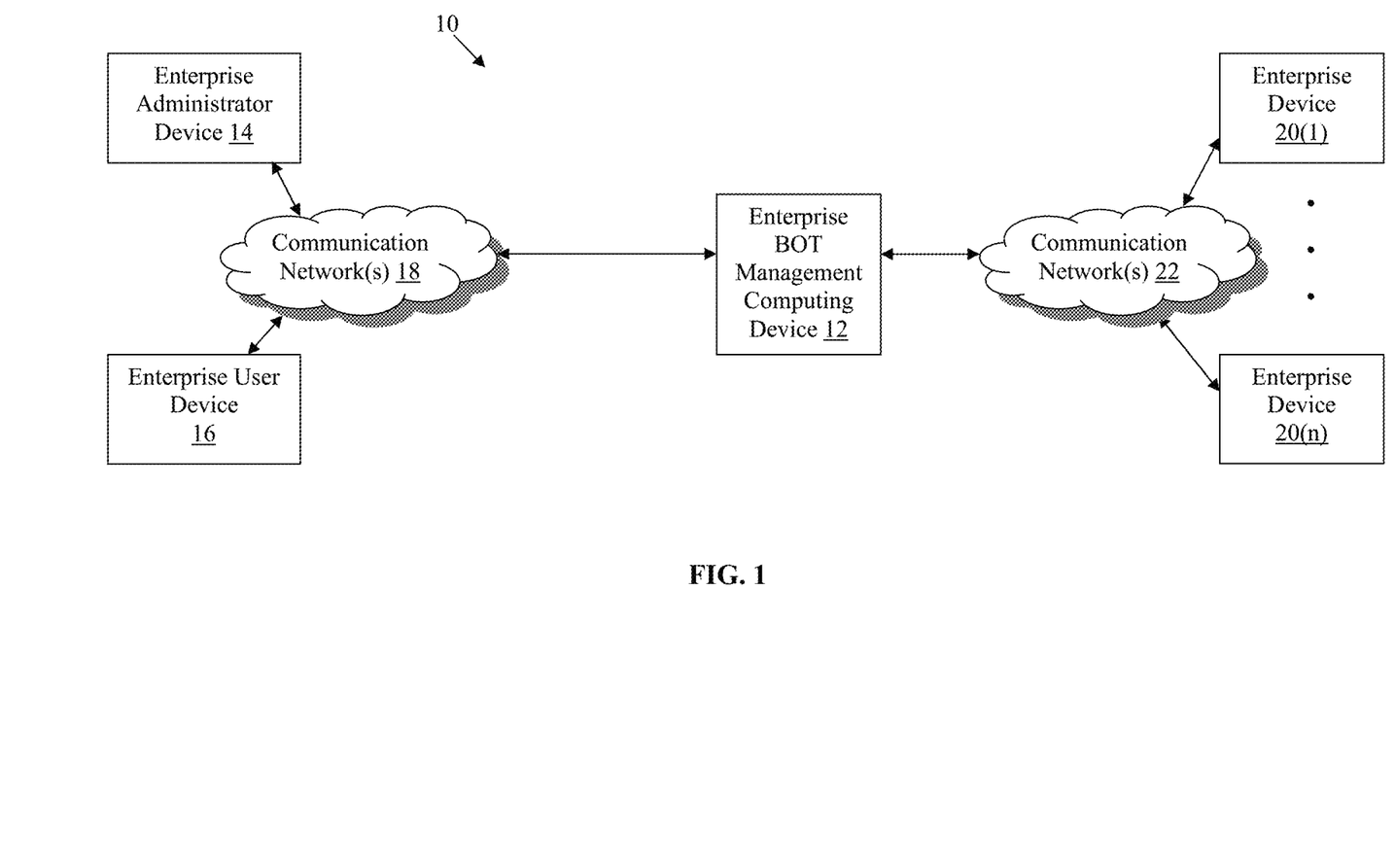
FIG. 1 is a diagram of an example of an environment with an enterprise BOT management computing device that creates and evaluates the performance of dynamic workflows of interoperable BOTs.

An environment 10 with an example of an enterprise BOT management computing device 12 is illustrated in FIG. 1. In this particular example, the enterprise BOT management computing device 12 is coupled to an enterprise administrator device 14 and an enterprise user device 16 by communication network(s) 18 and to enterprise devices 20(1)-20(n) by communication network(s) 22, although the environment 10 could include other types and numbers of systems, devices, components, and/or other elements in other configurations. This technology provides a number of advantages including methods, devices, and non-transitory computer readable media that create dynamic workflows of interoperable BOTs and evaluate the performance of the BOTs and workflows to optimize the workflows and more efficiently and effectively perform associated enterprise processes.

Figure 2:
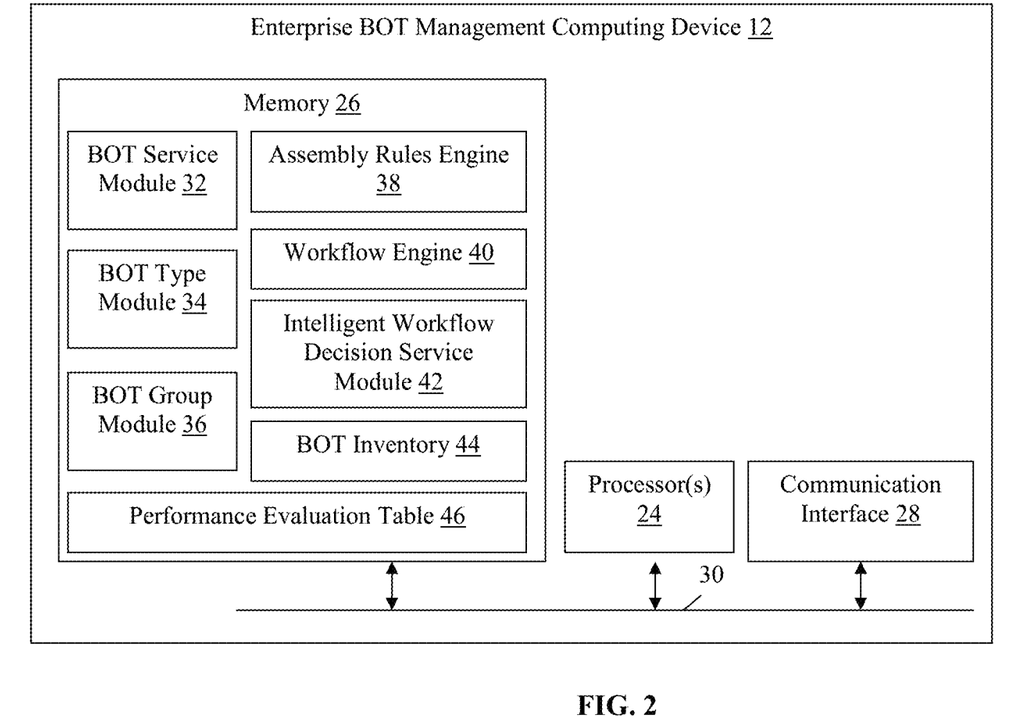
FIG. 2 is a block diagram of the enterprise BOT management computing device illustrated in FIG. 1.

Referring more specifically to FIGS. 1-2, the enterprise BOT management computing device 12 can include one or more processor(s) 24, a memory 26, and a communication interface 28, which are coupled together by a bus 30 or other communication link, although the enterprise BOT management computing device 12 can include other types and/or numbers of physical and/or virtual systems and/or processors, devices, components, and/or other elements in other configurations.

The processor(s) 24 of the enterprise BOT management computing device 12 can execute one or more programmed instructions stored in the memory 26 for creating and evaluating the performance of dynamic workflows of interoperable BOTs, as illustrated and described in the examples herein, although other types and/or numbers of instructions can also be performed. The processor(s) 24 of the enterprise BOT management computing device 12 may include one or more central processing units and/or general purpose processors with one or more processing cores, for example.

The memory 26 of the enterprise BOT management computing device 12 stores the programmed instructions and other data for one or more aspects of the present technology as described and illustrated herein, although some or all of the programmed instructions could be stored and executed elsewhere. A variety of different types of memory storage devices, such as a random access memory (RAM), read only memory (ROM), flash, solid state drives (SSDs), or other computer readable medium which is read from and written to by a magnetic, optical, or other reading and writing system that is coupled to the processor(s) 24, can be used for the memory 26. In this particular example, the memory 26 includes a BOT service module 32, a BOT type module 34, a BOT group module 36, an assembly rules engine 38, a workflow engine 40, an intelligent workflow decision service module 42, and a BOT inventory 44, although the memory 26 can include other data, modules, or applications in other examples.

The BOT service module 32 in this example facilitates management of BOTs via a user interface provided to the enterprise administrator device 14. In this example, BOTs are application or software components that automate a portion of an enterprise process or provide at least a portion of an automated enterprise service. In this example, the BOTs are interoperable such that the output of one BOT can be utilized as input of another BOT, have a common structure, and can exchange data, among other functions described and illustrated in more detail later. Management of the BOTs by the BOT service module 32 can include adding, deleting, viewing, editing, listing, and/or searching the BOTs, for example. Other functionality can also be provided by the BOT service module 32, including functionality provided based on the methods illustrated below in Table 1.

TABLE 1

| SL# | MethodName | Description |
|---|---|---|
| 1 | Start(BotID) | This method is used to set BOT state as Active to make it operational. When Start method is executed, BOT will start responding to the requests.<br>This can be used for a BOT whose status is BOT_DEPLOYED.<br>After executing the methods, event message with "READY_TO_USE" message is triggered. |
| 2 | Stop(BotID) | BOT stops all necessary services. BOT state is set as Inactive. Further BOT cannot be accessible.<br>This is used for a BOT whose status is BOT_TRANSACTIONS or READY_TO_USE. After executing the methods, event message with "BOT_DEPLOYED" message is triggered. |
| 3 | Assemble(BotID) Aka Build | This method is used when the BOT is in BOT_DEPLOYED Status. When user wants to train the BOT with a different set of data, this method is used.<br>This method is used when the BOT is in BOT_REGISTERED Status. This method will build the model and upload the Model so that BOT is ready for deployment.<br>When a new set of data is provided, the assemble function will help to rebuild the model. After completing this method, event message with "READY_TO_DEPLOY" message is triggered. |
| 4 | Deploy(BotID) | This method helps to load the uploaded model. After completing this method, event message with "BOT_DEPLOYED" message is triggered. |
| 5 | Verify(BotID)) | BOT can be tested using this function. This takes the input text data and processes the data and outputs results. This is used to test the BOT. |
| 6 | Status check(BotID) | Returns the status of the BOT such as active or inactive |
| 7 | Health Check(BotID) | This is used to get the status of the BOT. The status can be one of the below<br>BOT_REGISTERED<br>MODEL_BUILD_PROGRESS<br>MODEL_UPLOADING<br>READY_TO_DEPLOY<br>DEPLOY_IN_PROGRESS<br>BOT_DEPLOYED<br>READY_TO_USE<br>BOT_TRANSACTIONS |

Each of the BOTs in this example is created as an instance of a BOT type. The BOT type module 34 facilitates management of BOT types via a user interface provided to the enterprise administrator device 14, for example. Management of the BOT types can include adding, deleting, viewing, editing, listing, or searching the BOT types, for example, and other functionality can also be provided by the BOT type module 34. Exemplary BOT types include investigation BOTs, classifier BOTs, resolver BOTs, outlier BOTs, concept extraction BOTs, summarization BOTs, do it yourself BOTs, task assignment BOTs, research BOTs, service ticket BOTs, and/or diagnosis BOTs, although other types and/or numbers of BOTs can also be used in other examples.

The BOT group module 36 in this example facilitates management of groups of BOT instances of a same BOT type via a user interface provided to the enterprise administrator device 14, for example. Accordingly, the BOT group module 36 can establish groups of BOTs that assist with load balancing or handle a different set of data than one or more other instances of a same BOT type, for example. Management of the BOT groups can include adding, deleting, viewing, editing, listing, and/or searching the BOT groups, for example. Other functionality can also be provided by the BOT group module 32, including functionality provided based on the methods illustrated below in Table 2.

TABLE 2

| SL # | Function Name | Description |
|---|---|---|
| 1 | Get Maturity(BotGroupId) | This method returns the maturity of the BOT with respect to the trained data. This helps to know the performance of BOT in terms of learning with respect to the Data trained. |
| 2 | Set Maturity(BotGroupId) | This method sets the maturity of the BOT with respect to the trained data. This helps to know the performance of BOT in terms of learning with respect to the provided data set. If Bot is tried with different set of data, the maturity can help on using right set of data or can suggest the need of more data. Calculation method is explained below at ** |
| 3 | Get Rank Order(BotGroupId) | This method returns the Rank Order of the BOT with other BOTs of same type. This helps to know the performance of the BOT with other BOTs of same type |
| 4 | Set Reward Penalty Point(BotGroupId) | This method Sets the Rank Order of the BOT with other BOTs of same type. This helps to know the performance of the BOT with other BOTs of same type. Bot performance is calculated based on the accuracy of performance. |
| 5 | Set Thresh Hold(BotGroupId) | There are three thresh hold Frequency, Time and Points. This method helps to get the values from the configuration file and save for each BOT Among the three thresh holds (Frequency, Time and Points), when any one the value of thresh hold crosses, the synchronization between happens Separate variables will be used to calculate the latest actual values. When one of the value crosses the thresh hold value, the synchronization happens. |

The assembly rules engine 38 facilitates management of assembly rules via a user interface provided to the enterprise administrator device 14, for example. The assembly rules are used by the workflow engine 40 to assemble workflows of a plurality of BOTs for replicating enterprise processes. Each BOT type has different associated properties, functionality, and other characteristics to which the assembly rules can be applied when assembling workflows.

For example, assembly rules can require that BOTs of a classifier BOT type be the first BOT in a workflow, the last BOT in a workflow only if the previous BOT is of a curate BOT type, or the source BOT for a BOT of a resolver BOT type. In another example, an assembly rule can require that a BOT of a resolver BOT type must have a BOT of a classifier BOT type as its source BOT. Other types and number of assembly rules can also be used in other examples. Management of the assembly rules can include adding, deleting, viewing, editing, listing, and/or searching the assembly rules, for example, and other functionality can also be provided by the assembly rules engine 38.

The workflow engine 40 assembles workflows that include a plurality of BOTs in order to replicate or perform enterprise processes or functions or provide enterprise services. The workflow engine 40 assembles the workflows automatically based on the assembly rules and the current BOT instances and their associated BOT types. Accordingly, BOTs of various BOT types can be assembled by the workflow engine 40 in various manners in order to achieve functional relationships. BOTs are selected for inclusion in a workflow based on their functionality, performance, or service level, as described and illustrated in more detail later. In one example, a workflow can have a structure indicated below in Table 3, although workflows can also have other structures in other examples.

TABLE 3

| Property Name | Description |
|---|---|
| Bot Work Flow Id | Unique ID for the workflow |
| Bot Work flow Name | BOT workflow name |
| Status | Active or inactive |
| BOT Workflow members | A BOT ID array in order of workflow. Source and target BOTs are identified from the array order Source BOT: The BOT from which the current BOT gets data or the BOT after which the current BOT starts its operations. Target BOT: The BOT to which the current BOT sends data or the BOT that starts its operations after the current BOT. |
| Workflow Priority | The number used for prioritization of a workflow among selected workflows for evaluation table |
| Workflow Performance Value | Calculated from performance evaluation table and corresponds to the overall performance of a workflow |
| Last Synch Date | The date when the last synchronization of learned data took place in a workflow Among the three values (Frequency, Time and Points), when any one the values crosses a threshold, the synchronization proceeds |
| Last Synch Status | The status of the synchronization process of learned data. If previous synchronization is not completed, the process continues from where it stopped. Among the three values (Frequency, Time and Points), when any one the values crosses a threshold, the synchronization proceeds |

The workflow engine 40 can facilitate adding, deleting, viewing, editing, listing, or searching workflows, for example. Other functionality can also be provided by the workflow engine 40, including functionality provided based on the methods illustrated below in Table 4.

TABLE 4

| 1 | Horizontal Data Synch | Transfers learned model between parallel BOTs when the maturity threshold has been reached so that the other BOTs can perform with increased accuracy. |
|---|---|---|
| 2 | Start(Bot WorkflowID) | Sets workflow state as Active to make it operational. When Start method is executed, workflow will start responding to requests. Can be used for a workflow whose status is BOT_DEPLOYED. After executing the method, event message with "READY_TO_USE" message is triggered. |
| 3 | Stop(Bot WorkflowID) | Stops all necessary services. BOT state is set as Inactive. Further workflows cannot be accessible. This is used for a workflow whose status is BOT_TRANSACTIONS or READY_TO_USE. After executing the method, event message with "BOT_DEPLOYED" message is triggered. |

The intelligent workflow decision service module 42 also assembles workflows that include a plurality of BOTs in order to replicate or perform enterprise processes or functions or provide enterprise services. The intelligent workflow decision service module 42 assembles the workflows automatically based on the assembly rules and the current BOT instances and their associated BOT types, as well as a functionality, performance, or service level associated with the current BOT instances.

The intelligent workflow decision service module 42 can provide functions such as FunctionalityBasedWorkflowMethod( ), PerformanceBasedWorkFlowSelectionMethod( ), or ServiceLevelBasedWorkflowSelection( ) that can be called by an enterprise administrator using the enterprise administrator device 14, for example, and that are configured to generate workflows based on functionality, performance, or service level associated with the current BOT instances, respectively, as described and illustrated in more detail later.

The BOT inventory 44 in this example stores BOT and workflow data including established BOT types, instances of BOTs and associated BOT types, and data regarding established groups of BOTs. The BOT inventory 44 can also store assembly rules and current workflows and associated statuses, and other information can also be maintained in the BOT inventory 44. In some examples, the BOT inventory 44 is implemented as a database, although other storage structures can also be used.

The performance evaluation table 46 maintains reward and penalty values for each BOT and a BOT maturity value for each BOT, as well as workflow performance values for each workflow. Reward and penalty values are generated based on expert or end user feedback on the effectiveness of a BOT to perform an expected function or to response to a received request. The BOT maturity value for a BOT is generated based on the reward and penalty values for the BOT, as well as a total number of requests serviced by the BOT. Additionally, the workflow performance value for a workflow is generated based on the BOT maturity values for the BOTs that comprise the workflow. Generation of the BOT maturity and workflow performance values is described and illustrated in more detail later.

The communication interface 28 of the enterprise BOT management computing device 12 operatively couples and communicates between the client enterprise administrator device 14, enterprise user device 16, and the enterprise devices 20(1)-20(n) over the one or more communication network(s) 18 and 22. By way of example only, the communication network(s) 18 and 22 can include local area network(s) (LAN(s)) or wide area network(s) (WAN(s)), and can use TCP/IP over Ethernet and industry-standard protocols, although other types and numbers of protocols and/or communication networks can be used. The communication network(s) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The enterprise administrator device 14 can be used by an enterprise administrator to interface with the enterprise BOT management computing device 12 via the communication network(s) 18, such as to submit data and instructions via user interfaces provided by the enterprise BOT management computing device 12 and to receive data (e.g., workflow performance data), for example. The enterprise administrator device 14 may include a processor, a memory, and a communication interface, which are coupled together by a bus or other communication link, although the enterprise administrator device 14 could have other types and/or numbers of elements. The processor of the enterprise administrator device 14 may include one or more central processing units and/or general purpose processors with one or more processing cores by way of example only.

The memory of the enterprise administrator device 14 stores the programmed instructions and/or other data for one or more aspects of the present technology as described and illustrated herein, although some or all of the programmed instructions could be stored and executed elsewhere. A variety of different types of memory storage devices, such as a random access memory (RAM), read only memory (ROM), hard disk, solid state drives, or other computer readable medium which is read from and written to by a magnetic, optical, or other reading and writing system that is coupled to the processor for the enterprise administrator device 14, can be used for the memory for the enterprise administrator device 14.

The enterprise user device 16 can be used by an enterprise user to submit requests or tickets to the enterprise BOT management computing device 12 or one of the enterprise devices 20(1)-20( ) via one or more of the communication network(s) 18 and 22. For example, a user of the enterprise user device 16 can submit a request for a solution to a problem experience by a printer device, which can be one of the enterprise devices 20(1)-20(n), although requests can be obtained by the enterprise BOT management computing device 12, or directly by one of the BOTs managed thereby, in other ways.

The enterprise user device 16 may include a processor, a memory, and a communication interface, which are coupled together by a bus or other communication link, although the enterprise user device 16 could have other types and/or numbers of elements. The processor of the enterprise user device 16 may include one or more central processing units and/or general purpose processors with one or more processing cores by way of example only.

The memory of the enterprise user device 16 stores the programmed instructions and/or other data for one or more aspects of the present technology as described and illustrated herein, although some or all of the programmed instructions could be stored and executed elsewhere. A variety of different types of memory storage devices, such as a random access memory (RAM), read only memory (ROM), hard disk, solid state drives, or other computer readable medium which is read from and written to by a magnetic, optical, or other reading and writing system that is coupled to the processor for the enterprise user device 16, can be used for the memory for the enterprise user device 16.

The enterprise devices 20(1)-20(n) can be devices within the network environment 10 with which a BOT interacts to obtain or send data or perform another action. For example, one of the enterprise devices 20(1) can be a printer device with which a BOT of a resolver BOT type can install a printer drive in the event of printer issue classified by a BOT of a classifier BOT type as being a lack of a printer driver. Each of the enterprise devices 20(1)-20(n) may include a processor, a memory, and a communication interface, which are coupled together by a bus or other communication link, although the enterprise devices 20(1)-20(n) could have other types and/or numbers of elements. The processor of each of the enterprise devices 20(1)-20(n) may include one or more central processing units and/or general purpose processors with one or more processing cores by way of example only.

The memory of each of the enterprise devices 20(1)-20(n) stores the programmed instructions and/or other data for one or more aspects of the present technology as described and illustrated herein, although some or all of the programmed instructions could be stored and executed elsewhere. A variety of different types of memory storage devices, such as a random access memory (RAM), read only memory (ROM), hard disk, solid state drives, or other computer readable medium which is read from and written to by a magnetic, optical, or other reading and writing system that is coupled to the processor for the enterprise devices 20(1)-20(n), can be used for the memory for the enterprise devices 20(1)-20(n).

Although the exemplary network environment 10 with the enterprise BOT management computing device 12, enterprise administrator device 14, enterprise user device 16, enterprise devices 20(1)-20(n), and communication network(s) 18 and 22 are illustrated and described herein, other types and numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as one or more non-transitory computer readable media having instructions stored thereon for one or more aspects of the present technology as described and illustrated by way of the examples herein, as described herein, which when executed by one or more processors, cause the processors to carry out the steps necessary to implement the methods of this technology as described and illustrated with the examples herein.

Figure 3:
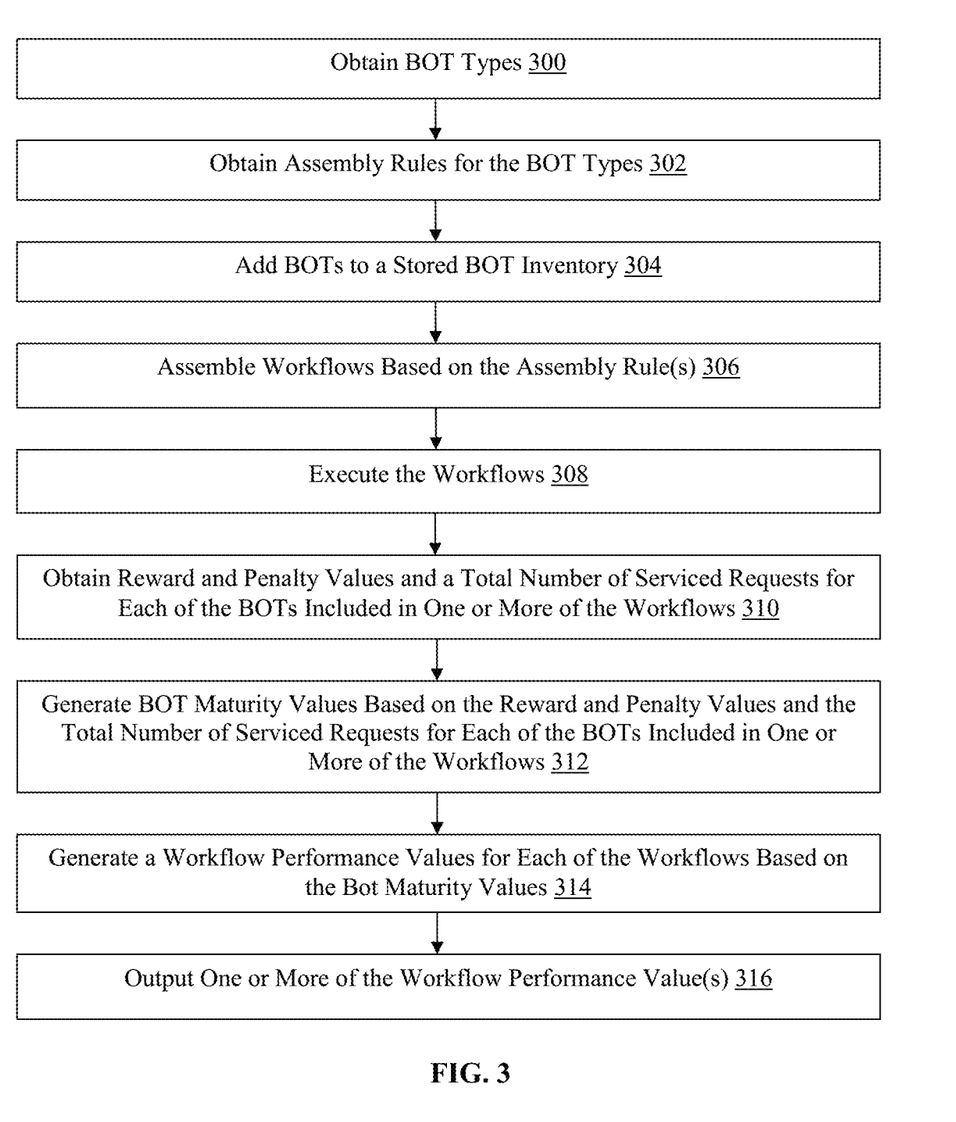
FIG. 3 is a flow chart of an example of a method for creating and evaluating the performance of dynamic workflows of interoperable BOTs.

An example of a method for creating and evaluating the performance of dynamic workflows of interoperable BOTs will now be described with reference to FIGS. 3-5. Referring more specifically to FIG. 3, in step 300, the enterprise BOT management computing device 12 obtains a plurality of different BOT types. In this example, the BOT types are obtained from the enterprise administrator device 14 via an interface provided by the BOT type module 34 and are stored in the BOT inventory 44, although the BOT types can be obtained or stored in other ways. The BOT types comprise the established BOT types available for association with an instance of a BOT.

In step 302, the enterprise BOT management computing device 12 obtains assembly rules for the BOT types. The assembly rules are obtained from the enterprise administrator device 14 via an interface provided by the assembly rules engine 38 and stored in the BOT inventory 44 in this example, although the assembly rules can also be obtained or stored in other ways. As described earlier, the assembly rules are used to generate workflows of BOTs and can constrain the BOTs that are included in workflows based on BOT types. For example, the assembly rules can require that BOTs of certain BOT types must be first or last in a workflow or must precede or follow one or more other BOT types, although other types of assembly rules can also be used.

In step 304, the enterprise BOT management computing device 12 adds BOTs to the BOT inventory 44. The BOTs can be added by an enterprise administrator using the enterprise administrator device 14 and one or more user interfaces or methods provided by the BOT service module 32, for example. As described in more detail earlier, BOTs are application or software components that automate a portion of an enterprise process or provide at least a portion of an automated enterprise service. Additionally, BOTs are interoperable, have a common structure, and have an associated one of the BOT types obtained in step 300.

In step 306, the enterprise BOT management computing device 12 assembles workflows based on one or more of the assembly rules. In one example, an enterprise administrator using the enterprise administrator device 14 can invoke a method provided by the workflow engine 40 or the intelligent workflow decision service module 42 to generate a workflow that replicates a defined enterprise process or service. In response, the workflow engine 40 or the intelligent workflow decision service module 42 identifies instances of BOT types to assemble into the workflow based on the assembly rules. Based on the specific invoked method, the workflow engine 40 or the intelligent workflow decision service module 42 further assembles the work flow based on an associated functionality, performance, or service level of each of the instances of the BOT types, as described and illustrated in more detail below.

Figure 4:
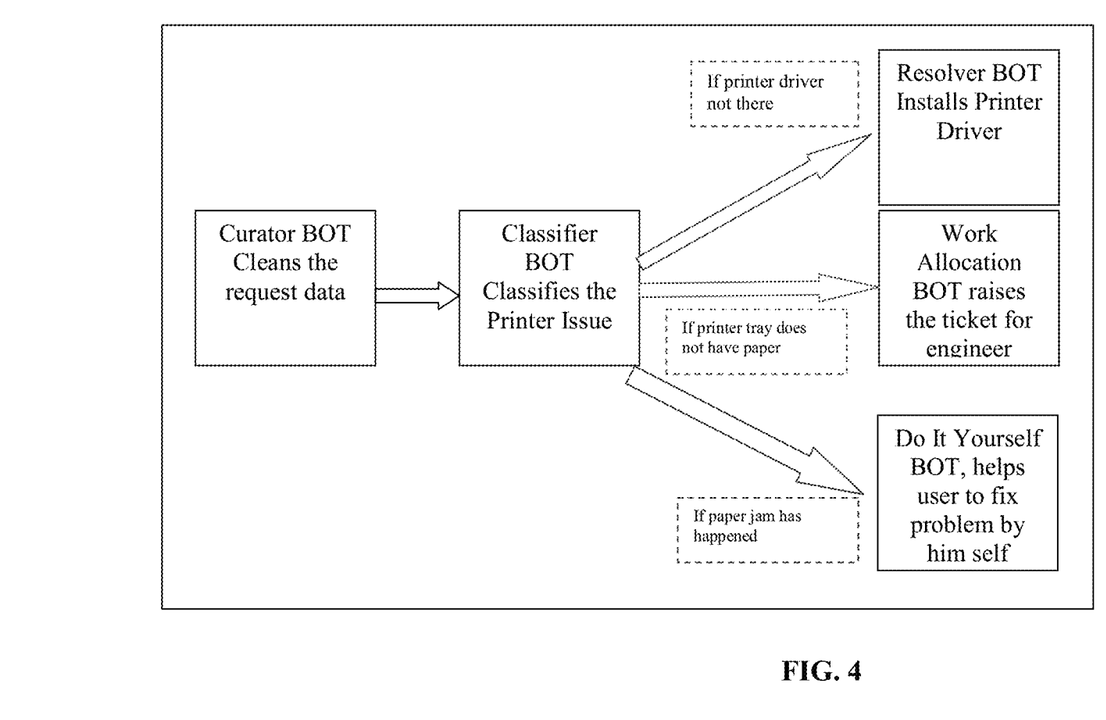
FIG. 4 is a functional block diagram of an example of a workflow of BOTs that is generated based on functionality of the included BOTs.

Referring more specifically to FIG. 4, a functional block diagram of an example of a workflow of BOTs that is generated based on functionality of the included BOTs is illustrated. In this particular example, a FunctionalityBasedWorkflowMethod( )method provided by the intelligent workflow decision service module 42 is invoked in order to assemble a workflow that processes issues relating to a printer one of the enterprise devices 20(1)-20(n). In this example, the enterprise BOT management computing device 12 determines that the enterprise process may require processing a problem message received from a user, classifying the printer issue, and taking an action depending on the classification of the printer issue.

Accordingly, in this particular example, the enterprise BOT management computing device 12 can include a curator BOT (e.g., a BOT of a curator BOT type) in the workflow first. The curator BOT is configured to process, clean, or filter the message received from the user regarding the printer issue. The enterprise BOT management computing device 12 then determines that there is a stored assembly rule that requires that a classifier BOT must be the target BOT for data output by a curator BOT. Accordingly, the enterprise BOT management computing device 12 includes a classifier BOT in the workflow that is configured to classify printer issues.

In this example, the classifier BOT is configured to classify three types of printer issues including determining that a printer driver is not installed, the paper tray for the printer does not have paper, and that a paper jam has occurred. Accordingly, the enterprise BOT management computing device 12 then identifies, and includes in the workflow, instances of 3 BOT types that are configured to handle the output data from the classifier BOT that identifies the printer issue. In this particular example, the three BOTs include a resolver BOT that is configured to install the printer driver, a work allocation BOT that is configured to generate a ticket for an engineer to fix the issue by installing more paper, and a do it yourself BOT that is configured to assist the user in fixing the paper jam, such as via a guided process.

Accordingly, in workflows generated based on functionality of included BOTs, one or more of the included BOTs can be configured to select during execution a target BOT based on generated output data and an input data type of input data for the target BOT. In the example illustrated in FIG. 4, the classifier BOT is configured to determine that if the printer issue is classified as a paper jam, the output data includes an indication of a printer location at which the jam has occurred, which corresponds with input data of the do it yourself BOT and results in the do it yourself BOT being selected as one of the target BOTs for the classifier BOT. Other types of input and output data, methods for determining target BOTs, and types and number of BOTs can also be used in other examples.

In another example, a PerformanceBasedWorkFlowSelectionMethod( ) method provided by the intelligent workflow decision service module 42 is invoked in order to assemble a workflow. In this example, the enterprise BOT management computing device 12 first assembles a plurality of test work flows based on the assembly rules. Each of the test workflows includes a set of BOTs that are associated with the same set of BOT types, but one or more of the BOTs in the set of BOTs for each test workflow is different than a corresponding BOT of the same BOT type in another set of BOTs included in another of the test work flows.

Accordingly, the test workflows include at least one or more BOTs that vary as compared to BOTs of the same type in one or more other of the test workflows based on input or output data, the algorithm used to perform the function associated with the BOT type, the role of the BOT, or one or more other characteristics. In one particular example, a test workflow WF1 can include BOTs BOTA-1+BOT B-1+ BOTC-1 and another test workflow WF2 can include BOTs BOTA-2+BOT B-1+BOTC-1, wherein BOTA-2 is of the same BOT type as BOTA-1 but uses a different algorithm to provide corresponding functionality as BOTA-1.

Next, each of the test workflows is tested or executed by the enterprise BOT management computing device 12 with different types of test input data such as positive, negative, false positive, and false negative data, for example. During the execution of each of the test workflows, each of the BOTs that comprise each of the test workflows is evaluated, and an associated BOT maturity value is generated for each of the BOTs based on the evaluation.

The enterprise BOT management computing device 12 evaluates each of the BOTs based on reward values, penalty values, and a total number of serviced requests for each of the BOTs. In this example, reward values are allocated to a BOT based on successful resolution of a request processed by the BOT and penalty values are allocated to a BOT based on unsuccessful resolution of a request processed by the BOT, although other types of reward and penalty values can also be used. The reward and penalty values can be allocated automatically based on whether a BOT provides a resolution that is predefined and expected, or the reward and penalty values can be allocated based on expert or end user analysis or feedback regarding the resolution provided by a BOT.

Accordingly, the BOT maturity value for a BOT is generated based on a difference between a sum of all of the reward values and a sum of all of the penalty values for the BOT divided by the total number of serviced requests processed by the BOT. Optionally, the BOT maturity value can be updated upon certain thresholds such as request frequency, time spent services requests, or number of rewards or penalties has been exceeded, for example, although other thresholds can also be used and the BOT maturity values can also be continuously recalculated. Also optionally, the BOT maturity values are stored by the enterprise BOT management computing device 12 in the performance evaluation table 46. An exemplary portion of the performance evaluation table 46 for four test work flows each comprising three BOTs of the same set of the three BOT types is illustrated below in Table 5.

TABLE 5

|  | Maturity Values for BOT Type A Variants | Maturity Values for BOT Type B Variants | Maturity Values for BOT Type C Variants |
| --- | --- | --- | --- |
| Test Work Flow-1 | 3.25 | 1.5 | 1.5 |
| Test Work Flow-2 | 2.5 | 2 | 1.25 |
| Test Work Flow-3 | 2 | 1.75 | 1.75 |
| Test Work Flow-4 | 1 | 2 | 2 |

As illustrated above, the variant of BOT type A in test workflow-1, BOT type B in test workflow-2, and BOT type C in test workflow-4 have the highest BOT maturity values among the BOTs of the same respective type. Accordingly, as a final step in this example, the workflow will be assembled to include the variant of BOT type A in test workflow-1, BOT type B in test workflow-2, and BOT type C in test workflow-4 in order to optimize the performance of the workflow. Optionally, the relatively low performing BOTs can be discarded or manually analyzed to identify any performance defects.

In yet another example, a ServiceLevelBasedWorkflowSelection( ) method provided by the intelligent workflow decision service module 42 is invoked in order to assemble a workflow. Referring more specifically to FIG. 5, a functional block diagram of an example of a workflow of BOTs that is generated based on a service level of the included BOTs is illustrated. In this example, the enterprise BOT management computing device 12 assembles a workflow that includes multiple BOTs of a same BOT type at multiple different service levels.

Figure 5:
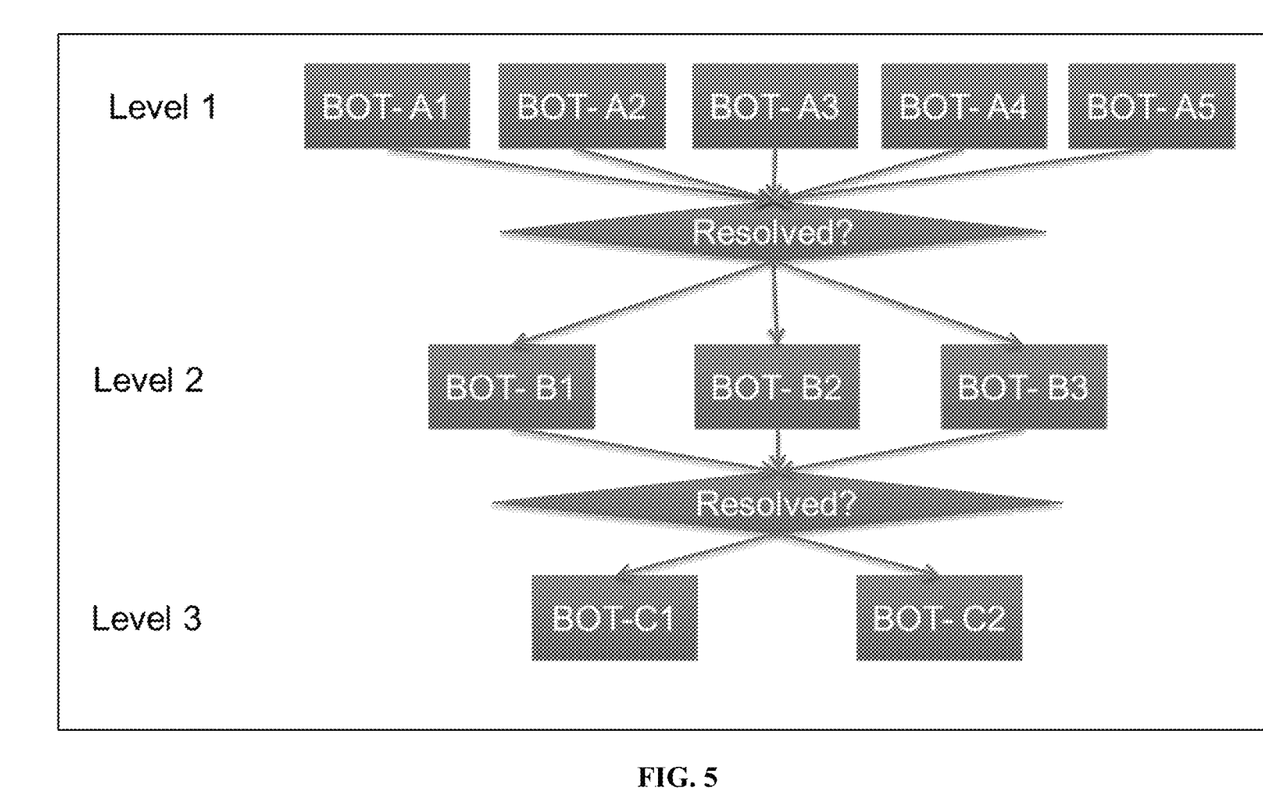
FIG. 5 is a functional block diagram of an example of a workflow of BOTs that is generated based on a service level of the included BOTs.

In the example illustrated in FIG. 5, the workflow includes service levels 1, 2, and 3 that include BOT-A1-BOT-A5, BOT-B1-BOT-B3, and BOT-C1 and BOT-C2, respectively. Each BOT can initially include a different algorithm or can otherwise approach a resolution in a different way than another BOT on a same or different service level. In one particular example, the BOTs in service level 2 may be of a do it yourself BOT type that provide different guided assistance in order to provide a resolution to a request and the BOTs in service level 3 may be of a script BOT type that provide different automated scripts that provide assistance without any user intervention in order to provide a resolution to a request. Different types and number of BOTs or service levels, and different types of variations between BOTs, can also be used in other examples.

Accordingly, when a request is generated, it is initially handled by one of the BOTs in service level 1. The one of the BOTs in service level 1 is configured to determine whether it can provide a resolution based on a generated confidence score. The one of the BOTs in service level 1 is configured to select an algorithm that is used to generate the confidence score, such as a nearest neighbor algorithm, for example. If the one of the BOTs in service level 1 cannot provide a resolution, then the request is communicated to one of the BOTs in service level 2. The one of the BOTs in service level 2 also generates a confidence score and determines whether is can provide a resolution. If the one of the BOTs in service level 2 cannot provide a resolution, then the request is communicated to one of the BOTs in service level 3.

However, if the one of the BOTs in service level 2 (or service level 3) is able to provide a resolution, resolution data including the details of the resolution is communicated, by the resolving BOT or the enterprise BOT management computing device 12, to each of the BOTs in the lower service level(s). Accordingly, in this example, BOTs in lower service levels are able to learn about resolutions over time and become increasingly effective at resolving requests based on their respective approaches.

Referring back to FIG. 3, in step 308, the enterprise BOT management computing device 12 executes the workflows generated in step 306. During execution, in step 310, the enterprise BOT management computing device 12 obtains reward and penalty values and a total number of serviced requests for each of the BOTs included in one of the executed workflows. The reward and penalty values and total number of serviced requests are optionally stored in the BOT inventory 44 and obtained as described in more detail earlier with reference to the test workflows evaluated in order to assemble a workflow based on a performance of the included BOTs in step 306.

In step 312, the enterprise BOT management computing device 12 generates BOT maturity values for each of the BOTs included in one of the workflows executed in step 308. The BOT maturity values are generated based on the reward and penalty values and total number of serviced requests for each of the BOTs included in one or more of the workflows executed in step 308. The BOT maturity values can also be generated as described in more detail earlier with reference to the test workflows evaluated in order to assemble a workflow based on a performance of the included BOTs in step 306. Optionally, the BOT maturity values can be stored in the BOT inventory 44 as associated with a corresponding one of the BOTs included in one or more of the workflows executed in step 308.

In step 314, the enterprise BOT management computing device 12 generates a workflow performance values for each of the workflows based on the BOT maturity values generated in step 312. Optionally, the workflow performance value is a summation of the BOT maturity values for each BOT in a workflow and a weight can be applied to the BOT maturity value for one or more BOT types associated with one or more BOTs in a workflow. Also optionally, the workflow performance values can be stored in the performance evaluation table 46 as associated with a corresponding one of the workflows executed in step 308. A portion of an exemplary performance evaluation table 46 is illustrated below in Table 6.

TABLE 6

|  | Maturity Values for BOT Type A Variants | Maturity Values for BOT Type B Variants | Maturity Values for BOT Type C Variants | Workflow Performance Value |
|---|---|---|---|---|
| Work Flow-1 | 3.25 | 1.5 | 1.5 | 14.25 |
| Work Flow-2 | 2.5 | 2 | 1.25 | 12.75 |
| Work Flow-3 | 2 | 1.75 | 1.75 | 11.25 |
| Work Flow-4 | 1 | 2 | 2 | 9 |

In this example, weights of 3, 2, and 1 are applied to the BOT maturity values for BOTs of BOT type A, B, and C, respectively, although other weights can be use in other examples include an equal weighting. Accordingly, workflow-1 has the highest workflow performance value. Other methods of generating the BOT maturity values or generating the workflow performance values can also be use in other examples.

In step 316, the enterprise BOT management computing device 12 outputs one or more of the workflow performance values. Optionally, an enterprise administrator can request a workflow performance value for one or more workflows, using a unique identifier for each of the workflows, from the enterprise BOT management computing device 12.

In response, the enterprise BOT management computing device 12 can retrieve the workflow performance values for the workflows from the performance evaluation table 46 based on the unique identifiers. Accordingly, the enterprise administrator can optionally analyze the low performing workflows as well as external factors that may be impacting performance, such as infrastructure, network issues, data overloading, or load balancing, for example.

Accordingly, as illustrated and described by way of reference to the examples herein, this technology provides methods, devices, and non-transitory computer readable media that optimize the assembly of workflows of interoperable BOTs having a common structure, as well as more effectively evaluate performance of the BOTs and workflows. With this technology, BOTs that automate portions of enterprise processes are automatically and dynamically assembled into workflows using assembly rules.

Advantageously, BOT performance can be evaluated using test workflows in order to assemble an optimized workflow for replicating an enterprise process. Additionally, workflows can be more effectively evaluated in order to optimize the workflows that are deployed within the enterprise. Moreover, this technology facilitates communication of resolution information between BOTs of various service levels in order to improve the learning process and optimize the resolution of issues handled by associated workflows.

Having thus described the basic concept of this technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this technology. Additionally, the recited order of processing elements or sequences, or the use of numbers, letters, or other designations therefore, is not intended to limit the claimed processes to any order except as may be specified in the claims. Accordingly, this technology is limited only by the following claims and equivalents thereto.

What is claimed is:

1. A method for creating automated dynamic workflows of interoperable BOTs, the method comprising:
adding, by an enterprise BOT management computing device, a plurality of interoperable BOTs to a stored BOT inventory, wherein each of the BOTs is associated with one of a plurality of BOT types, has a common structure, and automates at least a portion of an enterprise process;
obtaining, by the enterprise BOT management computing device, a plurality of assembly rules each comprising one or more constraints for inclusion of one or more of the BOTs in one or more of a plurality of test workflows based on the one of the plurality of BOT types associated with each of the one or more of the BOTs;
assembling, by the enterprise BOT management computing device, the plurality of test workflows based on the plurality of assembly rules, wherein each of the plurality of test workflows comprises BOT type variants of each BOT type;
obtaining, by the enterprise BOT management computing device, a plurality of reward values, a plurality of penalty values, and a total number of serviced requests for each of the BOTs;
generating, by the enterprise BOT management computing device, a BOT maturity value based on a difference between a sum of all of the plurality of reward values and a sum of all of the plurality of penalty values divided by the total number of serviced requests for each BOT of a subset of the BOTs included in each of the plurality of workflows;
evaluating, by the enterprise BOT management computing device, each of the plurality of workflows during execution to generate a workflow performance value for each of the plurality of workflows, wherein the workflow performance value is based at least in part on BOT maturity values for each BOT of the subset of the BOTs included in each of the plurality of workflows, wherein the BOT maturity value is generated during execution of the plurality of workflows;
dynamically assembling, by the enterprise BOT management computing device, a plurality of workflows to include a selection of BOTs, each of which is associated with the highest BOT maturity value among the BOT of a same type, wherein the BOT maturity values are generated for each of the plurality of interoperable BOTs during execution of the plurality of test workflows using test data of different types, including at least positive, negative, false positive, and false negative data; and
outputting, by the enterprise BOT management computing device, one or more of the workflow performance values.

2. The method of claim 1, wherein:
each BOT of the subset of the BOTs for one of the workflows is included in the plurality of workflows based on an associated functionality; and
at least one BOT of the subset of the BOTs for the one of the workflows is configured to select during execution a target BOT of the subset of the BOTs for the one of the workflows based on an output data type of output data generated by the at least one BOT of the subset of the BOTs for the one of the workflows and an input data type of input data for the target BOT of the subset of the BOTs for the one of the workflows.

3. The method of claim 1, wherein each BOT of the subset of the BOTs for one of the workflows is included in the plurality of workflows based on an associated performance, and the method further comprises:
evaluating, by the enterprise BOT management computing device, each of the plurality of the BOTs during execution of the plurality of test workflows using test data to generate the BOT maturity value for each of the plurality of the BOTs.

4. The method of claim 1, wherein:
each BOT of the subset of the BOTs for one of the workflows is included in the plurality of workflows based on an associated service level;
each BOT of first and second portions of the subset of the BOTs is configured to determine when a solution to a received request can be provided based on a generated confidence score, wherein the one of the workflows comprises at least a first level comprising the first portion of the subset of the BOTs having an associated first service level and a second level comprising the second portion of the subset of the BOTs having a second service level;
at least one BOT of the first portion of the subset of the BOTs is further configured to transfer the request to one BOT of the second portion of the subset of the BOTs, when the determining indicates that a solution to the request cannot be provided; and
at least one BOT of the second portion of the subset of the BOTs is further configured to provide resolution data to each BOT of the first portion of the subset of the BOTs, when the determining indicates that a solution to the request can be provided.

5. The method of claim 1, wherein dynamically assembling the plurality of workflows comprises evaluating performance of the plurality of workflows during execution based on performance of each BOT of the subset of the BOTs and optimize the plurality of workflows for replicating the enterprise process, wherein the performance of each BOT is evaluated by at least generating the BOT maturity value for each BOT of the subset of the BOTs included in each of the plurality of workflows.

6. An enterprise bot management computing device, comprising memory comprising programmed instructions stored in the memory and one or more processors configured to be capable of executing the programmed instructions stored in the memory to:
add a plurality of interoperable BOTs to a stored BOT inventory, wherein each of the BOTs is associated with one of a plurality of BOT types, has a common structure, and automates at least a portion of an enterprise process;
obtain a plurality of assembly rules each comprising one or more constraints for inclusion of one or more of the BOTs in one or more of a plurality of test workflows based on the one of the plurality of BOT types associated with each of the one or more of the BOTs;
assemble the plurality of test workflows based on the plurality of assembly rules, wherein each of the plurality of test workflows comprises BOT type variants of each BOT type;
obtain a plurality of reward values, a plurality of penalty values, and a total number of serviced requests for each of the BOTs;
generate a BOT maturity value based on a difference between a sum of all of the plurality of reward values and a sum of all of the plurality of penalty values divided by the total number of serviced requests for each BOT of a subset of the BOTs included in each of the plurality of workflows;
evaluate each of the plurality of workflows during execution to generate a workflow performance value for each of the plurality of workflows, wherein the workflow performance value is based at least in part on BOT maturity values for each BOT of the subset of the BOTs included in each of the plurality of workflows, wherein the BOT maturity value is generated during execution of the plurality of workflows;
dynamically assemble a plurality of workflows to include a selection of BOTs, each of which is associated with the highest BOT maturity value among the BOT of a same type, wherein the BOT maturity values are generated for each of the plurality of interoperable BOTs during execution of the plurality of test workflows using test data of different types, including at least positive, negative, false positive, and false negative data; and output one or more of the workflow performance values.

7. The enterprise bot management computing device of claim 6, wherein:

each BOT of the subset of the BOTs for one of the workflows is included in the plurality of workflows based on an associated functionality; and at least one BOT of the subset of the BOTs for the one of the workflows is configured to select during execution a target BOT of the subset of the BOTs for the one of the workflows based on an output data type of output data generated by the at least one BOT of the subset of the BOTs for the one of the workflows and an input data type of input data for the target BOT of the subset of the BOTs for the one of the workflows.

8. The enterprise bot management computing device of claim 6, wherein each BOT of the subset of the BOTs for one of the workflows is included in the plurality of workflows based on an associated performance, and the one or more processors are further configured to be capable of executing the programmed instructions stored in the memory to:

evaluate each of the plurality of the BOTs during execution of the plurality of test workflows using test data to generate the BOT maturity value for each of the plurality of the BOTs.

9. The enterprise bot management computing device of claim 6, wherein:

each BOT of the subset of the BOTs for one of the workflows is included in the plurality of workflows based on an associated service level;

each BOT of first and second portions of the subset of the BOTs is configured to determine when a solution to a received request can be provided based on a generated confidence score, wherein the one of the workflows comprises at least a first level comprising the first portion of the subset of the BOTs having an associated first service level and a second level comprising the second portion of the subset of the BOTs having a second service level;

at least one BOT of the first portion of the subset of the BOTs is further configured to transfer the request to one BOT of the second portion of the subset of the BOTs, when the determining indicates that a solution to the request cannot be provided; and at least one BOT of the second portion of the subset of the BOTs is further configured to provide resolution data to each BOT of the first portion of the subset of the BOTs, when the determining indicates that a solution to the request can be provided.

10. A non-transitory computer readable medium having stored thereon instructions for creating automated dynamic workflows of interoperable BOTs comprising executable code which when executed by one or more processors, causes the one or more processors to perform steps comprising:

adding a plurality of interoperable BOTs to a stored BOT inventory, wherein each of the BOTs is associated with one of a plurality of BOT types, has a common structure, and automates at least a portion of an enterprise process;

obtaining a plurality of assembly rules each comprising one or more constraints for inclusion of one or more of the BOTs in one or more of a plurality of test workflows based on the one of the plurality of BOT types associated with each of the one or more of the BOTs;

assembling the plurality of test workflows based on the plurality of assembly rules, wherein each of the plurality of test workflows comprises BOT type variants of each BOT type;

obtaining a plurality of reward values, a plurality of penalty values, and a total number of serviced requests for each of the BOTs;

generating a BOT maturity value based on a difference between a sum of all of the plurality of reward values and a sum of all of the plurality of penalty values divided by the total number of serviced requests for each BOT of a subset of the BOTs included in each of the plurality of workflows;

evaluating each of the plurality of workflows during execution to generate a workflow performance value for each of the plurality of workflows, wherein the workflow performance value is based at least in part on BOT maturity values for each BOT of the subset of the BOTs included in each of the plurality of workflows, wherein the BOT maturity value is generated during execution of the plurality of workflows;

dynamically assembling a plurality of workflows to include a selection of BOTs, each of which is associated with the highest BOT maturity value among the BOT of a same type, wherein the BOT maturity values are generated for each of the plurality of interoperable BOTs during execution of the plurality of test workflows using test data of different types, including at least positive, negative, false positive, and false negative data; and outputting one or more of the workflow performance values.

11. The non-transitory computer readable medium of claim 10, wherein:

each BOT of the subset of the BOTs for one of the workflows is included in the plurality of workflows based on an associated functionality; and at least one BOT of the subset of the BOTs for the one of the workflows is configured to select during execution a target BOT of the subset of the BOTs for the one of the workflows based on an output data type of output data generated by the at least one BOT of the subset of the BOTs for the one of the workflows and an input data type of input data for the target BOT of the subset of the BOTs for the one of the workflows.

12. The non-transitory computer readable medium of claim 10, wherein each BOT of the subset of the BOTs for one of the workflows is included in the plurality of workflows based on an associated performance, and the executable code when executed by the one or more processors causes the one or more processors to perform one or more additional steps comprising:

evaluating each of the plurality of the BOTs during execution of the plurality of test workflows using test data to generate the BOT maturity value for each of the plurality of the BOTs.

13. The non-transitory computer readable medium of claim 10, wherein:

each BOT of the subset of the BOTs for one of the workflows is included in the plurality of workflows based on an associated service level;

each BOT of first and second portions of the subset of the BOTs is configured to determine when a solution to a received request can be provided based on a generated confidence score, wherein the one of the workflows comprises at least a first level comprising the first portion of the subset of the BOTs having an associated first service level and a second level comprising the second portion of the subset of the BOTs having a second service level;

at least one BOT of the first portion of the subset of the BOTs is further configured to transfer the request to one BOT of the second portion of the subset of the BOTs, when the determining indicates that a solution to the request cannot be provided; and at least one BOT of the second portion of the subset of the BOTs is further configured to provide resolution data to each BOT of the first portion of the subset of the BOTs, when the determining indicates that a solution to the request can be provided.

* * * * *